United States Patent
Hannus et al.

(10) Patent No.: US 9,567,360 B2
(45) Date of Patent: Feb. 14, 2017

(54) PROCESS FOR PRODUCTION OF PRECIPITATED LIGNIN FROM BLACK LIQUOR AND PRECIPITATED LIGNIN PRODUCED BY THE PROCESS

(75) Inventors: Mikael Hannus, Stockholm (SE); Maria Björk, Karlstad (SE); Niklas Garoff, Skärholmen (SE); Ingrid Englund, Karlstad (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 13/808,398

(22) PCT Filed: Jul. 7, 2011

(86) PCT No.: PCT/SE2011/050920
§ 371 (c)(1),
(2), (4) Date: Feb. 4, 2013

(87) PCT Pub. No.: WO2012/005677
PCT Pub. Date: Jan. 12, 2012

(65) Prior Publication Data
US 2013/0131326 A1    May 23, 2013

Related U.S. Application Data

(60) Provisional application No. 61/362,011, filed on Jul. 7, 2010.

(51) Int. Cl.
*C07G 1/00* (2011.01)
*D21C 11/00* (2006.01)
*C08H 7/00* (2011.01)

(52) U.S. Cl.
CPC *C07G 1/00* (2013.01); *C08H 6/00* (2013.01); *D21C 11/0007* (2013.01)

(58) Field of Classification Search
CPC .......... C07G 1/00; C08H 6/00; C08L 97/005; D21C 3/02; D21C 11/0007
USPC .......................................... 530/500; 159/47.3
See application file for complete search history.

(56) References Cited

U.S. PATENT DOCUMENTS

| | | | |
|---|---|---|---|
| 1,297,028 A | 3/1919 | Soraas | |
| 2,828,297 A * | 3/1958 | Giesen | 530/500 |
| 2,994,633 A | 8/1961 | Clark | |
| 3,048,576 A | 8/1962 | Bail et al. | |

(Continued)

FOREIGN PATENT DOCUMENTS

| | | |
|---|---|---|
| CA | 1172808 | 8/1984 |
| WO | 2006031175 | 3/2006 |

OTHER PUBLICATIONS

Ohman, F., et al. "Filtration properties of lignin precipitated from black liquor," 2007, Tappi J., vol. 6, No. 7, 3-9.*

(Continued)

*Primary Examiner* — Liam J Heincer
*Assistant Examiner* — Nicholas Hill
(74) *Attorney, Agent, or Firm* — Greer, Burns & Crain, Ltd.

(57) ABSTRACT

The present invention relates to a process tor the production of precipitated lignin from black liquor wherein the process comprises the steps of providing a black liquor stream treating the black liquor at an increased temperature and precipitating the lignin from the heat treated black liquor. The present invention further relates to precipitated lignin produced according to the process and use of the precipitated lignin produced.

7 Claims, 1 Drawing Sheet

(56) References Cited

U.S. PATENT DOCUMENTS

| | | | |
|---|---|---|---|
| 4,929,307 A * | 5/1990 | Kiiskila et al. | 159/47.3 |
| 4,946,946 A | 8/1990 | Fields et al. | |
| 4,953,607 A * | 9/1990 | Erkki | B01D 1/26 |
| | | | 159/13.3 |
| 5,472,568 A * | 12/1995 | Mullen et al. | 162/30.11 |
| 5,705,032 A * | 1/1998 | Harbinson et al. | 162/30.11 |
| 5,811,527 A | 9/1998 | Ishitoku et al. | |
| 6,239,198 B1 | 5/2001 | Abaecherli et al. | |

OTHER PUBLICATIONS

Parrish, D., "Black Liquor Recovery Boilers—An Introduction," National Board Bulletin, Winter 1998, printed online from http://www.nationalboard.org/PrintPage.aspx?pageID=164&ID=231 on Nov. 13, 2015.*

Ragnar, M., et al., "Pulp," Ullmann's Encyclopedia of Industrial Chemistry, article first published online: Jun. 15, 2000).*

Draucker, L., "Novel Solvent System for the Development of Sustainable Technology," dissertation thesis, 2007, 176 pages.*

Ohman et al., "Precipitation and filtration of lignin from black liquor of different origin," Nordic Pulp and Paper Research Journal, vol. 22, No. 2, pp. 188-193, dated 2007.

Wallmo et al., "The influence of hemicelluloses during the precipitation of lignin in kraft black liquor," Nordic Pulp and Paper Research Journal, vol. 24, No. 2, pp. 165-171, dated 2009.

* cited by examiner

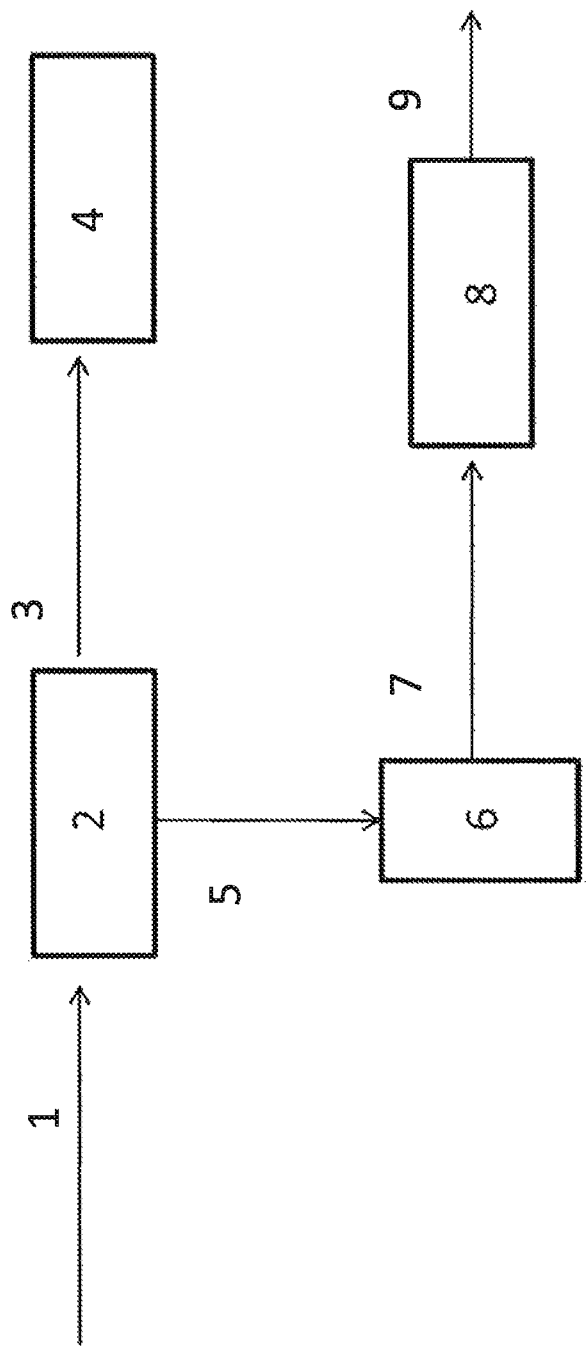

PROCESS FOR PRODUCTION OF PRECIPITATED LIGNIN FROM BLACK LIQUOR AND PRECIPITATED LIGNIN PRODUCED BY THE PROCESS

This application is a U.S. National Stage under 35 U.S.C. §371 of International Application No. PCT/SE2011/050920, filed Jul. 7, 2011, which claims priority from U.S. Provisional Patent Application No. 61/362,011, filed Jul. 7, 2010.

FIELD OF INVENTION

The invention relates to a process for the production of precipitated lignin from black liquor. The invention further relates to precipitated lignin produced according to the process and a solution comprising precipitated lignin as well as different end uses of the precipitated lignin.

BACKGROUND

Black liquor is the spent cooking liquor from the kraft process when digesting wood into pulp removing lignin, hemicelluloses and other extractives from the wood in order to free the cellulose fibers.

The black liquor contains more than half of the energy content of the wood fed into the digester. It is normally concentrated to 65-80% by evaporators and burned in a recovery boiler to produce energy and recover the cooking chemicals. U.S. Pat. No. 4,929,307 describes a process for treating black liquor with heat in order to improve the evaporability of black liquor.

Lignin which is present in the black liquor is a complex chemical compound derived from wood, and an integral part of the secondary ceil walls of plants. Lignin plays a crucial part in conducting water in plant stems.

Lignin is a by-product of pulping processes of cellulosic raw material. There are various pulping processes such as kraft, organosolv or soda pulping. There are also various natural cellulosic raw materials which are used in such pulping processes. The cellulosic raw material and pulping processes are typically selected and optimized for the cellulose products produced, such as paper or board. The characteristics of the lignin are a result of the used raw material and the variation in that material as well as on the variation in the pulping process. Consequently, there is a big variation in the characteristics of black liquor and the lignin depending on which cellulosic raw material used, i.e. hardwood or softwood, as well on the pulping process.

There are different end uses for precipitated lignin which has been removed from, black liquor. It may be burned as a fuel or be used as a component or additive in chemical processes and products.

Today, there exist several different processes for the separation and precipitation of lignin from black liquor. One example is described in WO2006031175 A. This process for precipitation of lignin does not give the possibility to control or modify the viscosity of the precipitated lignin. However, control of viscosity, and a decrease of viscosity in particular, may be important in subsequent process steps for further processing of precipitated lignin.

There is thus a need for an improved, process for the production of lignin with improved properties, such as reduced viscosity.

SUMMARY OF INVENTION

It is an object of the present invention to provide an improved process for the production of precipitated Lignin.

It is another object of the present invention to produce precipitated lignin with improved properties, such as decreased average molecular weight and reduced viscosity and a lower degree of impurity due to residual hemicellulose.

It is another object of this invention to produce precipitated Lignin with a higher degree of quality consistency with respect to the improved properties.

It is another object of this invention to produce a slurry or solution comprising a solvent, such as an organic solvent, and precipitated Lignin with improved properties and higher quality consistency with respect to the improved properties.

It is yet another object of this invention to improve the separation of precipitated lignin from the liquid phase.

These, as well as other objects are achieved by the present invention.

The present invention relates to a process for the production of precipitated Lignin from black liquor wherein the process comprises the steps of; providing a black liquor stream, treating the stream of black liquor at an increased temperature and precipitating the lignin from the heat treated black liquor. By increasing the temperature of the black liquor before the lignin is precipitated, it has been shown that the average molecular weight of the precipitated lignin and the degree of impurities due to residual hemicelluoses is reduced. In this way it is possible to produce lignin with reduced viscosity as well as a solution comprising the precipitated lignin with reduced viscosity. Moreover, this process is a very efficient and economic favorable process for the production of precipitated lignin with improved properties.

The lignin may be precipitated by decreasing the pH of the black liquor. The pH may be decreased in one or more subsequent steps.

It is preferred that the temperature of the black liquor during heat treatment is increased to 150-200° C., preferably between 170-190° C.

The black liquor may be treated at increased temperature for 1-60 minutes, preferably for 1-5 minutes.

The pH of the black liquor may be at least partly reduced before the temperature of the black liquor is increased. In this way partly precipitated lignin may be present in the black liquor during the heat treatment.

The black liquor may be evaporated before the temperature of the black liquor is increased. It may be favorable to increase the dry content of the black liquor before the heat treatment in order to reduce the energy needed during the heat treatment. Since the amount of water is reduced during evaporation, less energy is needed in order to increase the temperature of the black liquor to the desired level. The black liquor may have a solid content of between 30-50% ts before heat treatment or during heat treatment.

The invention further relates to precipitated lignin produced according to the process mentioned above. It has been shown that the precipitated lignin produced according to this process will have a decreased average molecular weight compared to precipitated lignin produced according to processed described in prior art.

The precipitated lignin produced may have improved fllterability due to the decrease in average molecular weight of the produced precipitated lignin and lower amount of residual hemicellulose. The precipitated lignin produced may thus also have a lower degree of impurity with respect to residual hemicellulose.

The invention further relates to a solution comprising a solvent and precipitated lignin wherein the solution has decreased viscosity and lower degree of impurity with respect to hemicellulose. It has been shown that a solution comprising precipitated lignin produced according to the process described above, will have lower viscosity compared to a solution comprising precipitated lignin produced according to prior art.

The invention further relates to the use of the precipitated lignin in biorefinery-related applications, energy recovery or as a compound in a chemical process or product. The produced precipitated lignin is preferably used in for the above mentioned causes. Due to the improved properties of the precipitated lignin, the handling and subsequent processing of the precipitated lignin is improved and facilitated.

SHORT DESCRIPTION OF THE DRAWING

FIG. 1 shows a schematic view of one embodiment according to the invention.

DETAILED DESCRIPTION OF THE INVENTION

By combining heat treatment of black liquor followed by precipitation of lignin of the heat treated black liquor it is possible to precipitate lignin from black liquor in a very efficient way. The process according to the invention is both easier and more cost efficient compared to other processes for the production of precipitated lignin, especially for the production of lignin with low viscosity and a low average molecular weight.

Furthermore, it has been shown that the heat treatment of the black liquor in order to reduce the viscosity also will improve the precipitation of the lignin from the black liquor. The precipitation process of the lignin will be much more efficient due to the improved properties of the black liquor per se and the lignin in the heat treated black liquor.

The precipitated lignin will have improved properties, e.g. the filterability of the precipitated lignin is improved due to a decreased amount of residual hemicellulose. Residual hemicelluloses may form hydrogels that increases filter resistance during separation of precipitated lignin from the aqueous phase. The amount of residual hemicellulose in the black liquor is reduced during heat treatment and the subsequent process steps, such as filterability, is thus improved.

Furthermore, the viscosity of a slurry or solution comprising a solvent, such as an organic solvent, and precipitated lignin, will be reduced. This makes the slurry or solution comprising lignin easier to handle. Pumping of the slurry or solution comprising the precipitated lignin is improved and it is also possible to improve mixing of the lignin with other components. The viscosity of the slurry or solution comprising lignin depends on the heat treatment, for example the time and temperature of the treatment as well as of the pulping process which produces the black liquor.

The characteristics of the precipitated lignin, such as viscosity, can normally not easily be reduced or modified in processes according to prior art. The process according to the present invention, aims at offering a possibility to reduce viscosity, molecular weight and increase quality consistency of the precipitated lignin or of a solution comprising the precipitated lignin. This is important in order to enable further use of the precipitated lignin for example in energy recovery or biorefinery-related applications, or even as a compound in chemical processes and products. The decrease of the viscosity of the precipitated lignin enables a higher quality consistency of products and intermediate products in subsequent processes.

The viscosity of the precipitated lignin can be measured at the pure lignin at a temperature above the glass-transition temperature. Alternatively, the viscosity of the precipitated lignin can be measured on a solution comprising dissolved or dispersed lignin in a liquid or solvent. Due to the differences in the produced lignin, due to differences in the pulping processes and in the used cellulosic raw material, the viscosity as well as other properties of the precipitated lignin will strongly vary. The process according to this invention gives a lignin with lower viscosity and lower variation in viscosity than lignin produced according to prior art.

The provided black liquor is produced during digestion of cellulosic material. The formed black liquor is separated from the digested cellulosic material and at least one part of the separated black liquor is treated at an increased temperature and lignin is precipitated and thereafter separated from the heat treated black liquor.

It is preferred that at least one part of the black liquor separated from the digester is treated according to the invention, i.e. it is not necessary to treat the entire separated black liquor stream. It is preferred that 5-100%, preferably 5-50%, of the total amount of black liquor from the digester is treated according to the invention. In this way some of the black liquor is burned in a recovery boiler for utilization of the energy of the black liquor. How much of the separated black liquor that is conduced to the recovery boiler respectively to the heat treatment followed by precipitation depends on the demand on respectively end product. Sometimes it is desirable to produce a large amount of precipitated lignin and thus a large amount of separated black liquor is heat treated and thereafter precipitated.

The increase of temperature of the black liquor is preferably performed by addition of steam. Steam is often easy available in a pulp mill and since the black liquor comprises water, addition of more water in the form of steam, do not negatively affect the subsequent treatments. Other conventional methods in order to increase the temperature of the black liquor may however also be used.

The temperature is increased to above the temperature used during digestion of the cellulosic material, i.e. above the digesting temperature. It is preferred that the temperature is between 150-200° C., preferably between 170-190° C. During the heat treatment the molecular weight of the lignin is reduced. This results in that the viscosity of the black liquor as well as on the lignin of the black liquor is reduced.

The lignin may be precipitated by several subsequent acidifications and washing steps. For example, it is possible to first acidifying the black liquor followed by dewatering. The obtained lignin filter cake is thereafter suspended and the pH is reduced once again followed by a second dewatering. The lignin is thereafter washed by displacement washing and the produced lignin is finally dewatered. In this way a lignin with high dry content is formed. One example of such process for precipitation of lignin is described in more derail in WO2006031175 A.

Other methods for precipitating lignin may also be used. For example, membrane filters which will separate the lignin from the black liquor. However, other conventional methods for separate or precipitate lignin from black liquor may also be used.

If the process similar to or the one described in WO2006031175 A is used in order to precipitate the lignin, it is possible to first reduce the pH of the black liquor followed by heat treating the black liquor and thereafter continue the process as described in WO200631175 A, i.e.

continue with different washing steps and additional steps for decreasing the pH in order to fully precipitate the lignin.

The produced lignin may be used in biorefinery-related applications, as energy recovery or as a compound in chemical processes or products. It can be used as an additive in different components, such as plastics.

FIG. 1 describes a schematic view of the process according to one embodiment of the invention. Black liquor (1) from the digester (not shown) in which cellulosic material is digested and black liquor is formed, is conducted to an evaporator (2). The evaporated black liquor (3) is conduced to a recovery boiler (4) in order to extract the energy from the black liquor. At least one part of the black liquor (5) is removed from the evaporator (2) and conducted to a heat treatment (6) where the temperature of the black liquor is increased above the temperature used in the digester. After the heat treatment (6) the black liquor is conducted to a precipitation process (7) in which precipitated lignin is formed. The precipitated lignin (8) is thereafter used in desired ways.

The dry solid content of the black liquor (1) conducted from the digester is approximately 10% ts. During evaporation water is removed and the dry content is increased. The dry content of the black liquor (3) after the evaporation is increased to approximately 80% ts. It is preferred to remove at least one part of the black liquor (5) from the evaporator (2) before the dry content is increased too much. The dry content of the black liquor (5) to be treated at increased temperature is preferable between 30-50% ts. The black liquor is thus removed from the evaporator (2) when the dry content is at desired level. It is preferred that the black liquor (3) has a high solid content when it is conducted to the recovery boiler (4), since it is more energy efficient to burn black liquor with high solid content in the recovery boiler (4), i.e. it comprises less amount of water. However, it is not practical to handle and treat black liquor with too high dry content with neat, followed by precipitating the lignin from it. Consequently, the dry content of the black liquor treated according to the invention is preferably lower.

The precipitated lignin according to the invention is preferably used in biorefinery-related applications, energy recovery or as a compound in a chemical process or product. Due to the improved properties of the precipitated lignin, such as she reduced amount of hemicelluloses the purity of the lignin is improved and that is an advantage in many products. Furthermore, the handling and subsequent processing of the precipitated lignin is improved and facilitated and that makes it useful in many chemical processes.

EXAMPLE

Black liquor from softwood kraft cooking process was treated at a temperature of 180° C. for a period of 30 minutes. The heat treated black liquor was thereafter precipitated by decreasing the pH to about 10. The precipitated lignin was thereafter filtrated and washed.

Table 1 below shows the results of measurements of the molecular mass and the viscosity of a precipitated lignin precipitated from heat treated black liquor according to the invention.

The molecular mass of the lignin was measured with a Gel Permeation Chromatography (GPC).

The viscosity was measured on a slurry comprising the precipitated lignin at 20 wt % in an organic solvent (in this case we used polyether polyol) and heated the slurry to 80° C. for an hour and the viscosity was thereafter measured with a spindle Viscometer.

TABLE 1

Comparison of lignin from untreated black liquor as a reference and lignin from heat treated black liquor

| | Unit | Lignin from untreated black liquor (ref) | Lignin from heat treated black liquor |
|---|---|---|---|
| Molecular mass, Mw | Dalton | 4810 | 4050 |
| Viscosity (of the slurry with an organic solvent, at 25° C.) | cP | 2170 | 1320 |

As can be seen from Table 1, both the molecular mass of the lignin and the viscosity of the slurry comprising Lignin being precipitated from the heat treated black liquor, is reduced.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for the production of precipitated lignin from black liquor wherein the process comprises the steps of:
   providing a black liquor including lignin,
   increasing the solids content of the black liquor by evaporating water from the black liquor,
   precipitating a portion of the lignin to provide black liquor with partially precipitated lignin;
   heat treating at least a portion of the black liquor with partially precipitated lignin having a solids content between 30-50% total solids after the solids content has been increased at a temperature of 150-200° C. to decrease a viscosity of the heat treated black liquor as a result of the heat treating and form a heat treated black liquor, and
   precipitating lignin from the heat treated black liquor after heat treating to form a precipitated lignin.

2. The process according to claim 1 wherein the lignin is precipitated by decreasing the pH of the heat treated black liquor.

3. The process according to claim 1 wherein the temperature is 170-190° C.

4. The process according to claim 1 wherein the black liquor is heat treated for 1-60 minutes.

5. The process according to claim 1 wherein the black liquor is heat treated at the temperature for 1-5 minutes.

6. The process of claim 1, where the solids content of the black liquor including lignin is initially approximately 10% total solids.

7. The process of claim 1, wherein the solids content of the black liquor is increased to approximately 80% total solids, and wherein the process further comprises:
   removing the portion of the black liquor that is heat treated before the solids content of the black liquor is increased to 80% total solids.

* * * * *

UNITED STATES PATENT AND TRADEMARK OFFICE
CERTIFICATE OF CORRECTION

| | | |
|---|---|---|
| PATENT NO. | : 9,567,360 B2 | Page 1 of 1 |
| APPLICATION NO. | : 13/808398 | |
| DATED | : February 14, 2017 | |
| INVENTOR(S) | : Mikael Hannus et al. | |

It is certified that error appears in the above-identified patent and that said Letters Patent is hereby corrected as shown below:

In the Specification

Column 5, Line 37: Please delete "neat" and insert -- heat -- therefor.

Column 5, Line 44: Please delete "she" and insert -- the -- therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*